United States Patent
Van Dijnsen et al.

(10) Patent No.: US 6,821,224 B2
(45) Date of Patent: Nov. 23, 2004

(54) DRIVE BELT, METHOD FOR MANUFACTURING A CONTINUOUS BAND THEREOF AND CONTINUOUSLY VARIABLE TRANSMISSION WHEREIN SUCH IS UTILIZED

(75) Inventors: Gerardus Petrus Maria Van Dijnsen, Eindhoven (NL); Arjen Brandsma, Tilburg (NL); Johannes Hendrikus Van Lith, Berlicum (NL); Cornelis Johannes Maria Van Der Meer, Tilburg (NL); Johannes Haaije Van Der Kamp, Tilburg (NL); Bert Pennings, Goirle (NL)

(73) Assignee: Van Doorne's Transmissie B.V., Tilburg (NL)

( * ) Notice: Subject to any disclaimer, the term of this patent is extended or adjusted under 35 U.S.C. 154(b) by 192 days.

(21) Appl. No.: 10/184,956

(22) Filed: Jul. 1, 2002

(65) Prior Publication Data

US 2003/0004024 A1 Jan. 2, 2003

(30) Foreign Application Priority Data

Jul. 2, 2001 (EP) ............................................. 01202533

(51) Int. Cl.$^7$ .............................. F16G 1/21; F11G 5/16
(52) U.S. Cl. ....................................... 474/242; 474/201
(58) Field of Search ................................ 474/201, 242, 474/245, 237, 248, 240

(56) References Cited

U.S. PATENT DOCUMENTS 4,465,469 A * 8/1984 Cataldo ....................... 474/201
4,823,608 A * 4/1989 Satoh ............................. 73/783
6,123,637 A * 9/2000 Yagasaki ...................... 474/242
6,464,606 B2 * 10/2002 Brandsma et al. ........... 474/242

FOREIGN PATENT DOCUMENTS

| EP | 0 279 645 | 7/1991 | |
|---|---|---|---|
| EP | 0 283 303 | 8/1992 | |
| GB | 2 087 032 | 5/1982 | |
| JP | 10-311-378 A * | 11/1998 | ............. F16G/5/16 |
| JP | 2001-241510 A * | 9/2001 | ............. F16G/5/16 |
| JP | 2001-263430 A * | 9/2001 | ............. F16G/5/16 |

* cited by examiner

Primary Examiner—Marcus Charles
(74) Attorney, Agent, or Firm—Young & Thompson

(57) ABSTRACT

A drive belt (1) includes at least one continuous band (22) engaged with a number of (plate-like) transverse elements (30) such that the elements (30) may slide freely along a longitudinal direction (L) of the continuous band (22), whereby the elements (30) are provided with a taper (31) allowing mutual rotation of adjacent transverse elements (30) about a transversely oriented axis (32) thereby defining a minimum radius of curvature ($R_{MIN}$) at which the drive belt (1) may be bent in its longitudinal direction (L) and whereby the continuous band (22) is provided with an internal residual stress distribution conforming to a longitudinally bent posture having a pre-bending radius ($R_{PB}$), characterized in that, the pre-bending radius ($R_{PB}$) of the at least one continuous band (22) is considerably larger than twice the minimum radius of curvature ($R_{MIN}$).

20 Claims, 3 Drawing Sheets

DRIVE BELT, METHOD FOR MANUFACTURING A CONTINUOUS BAND THEREOF AND CONTINUOUSLY VARIABLE TRANSMISSION WHEREIN SUCH IS UTILIZED

BACKGROUND OF THE INVENTION

The present invention relates to a drive belt. The invention further relates to a method for producing a continuous band of such drive belt and to a continuously variable transmission wherein such drive belt is utilised.

DESCRIPTION OF THE RELATED ART

Drive belts of the present type are generally known through their application in continuously variable transmissions intended for the transmission of mechanical power at continuously variable speed and torque ratios between an engine and a load in particular for automotive purposes. Such drive belts are also known from the patent specification EP-0.279.645 B1. The known drive belt generally comprises one or two endless rings and an array of plate-like transverse elements oriented mutually parallel transverse to a longitudinal direction of the drive belt, whereby the endless ring Is provided in a slot of the elements such that the elements may freely slide along the ring in the longitudinal direction thereof. The endless ring typically is laminated comprising a number of concentrically stacked continuous bands. Through this measure, the ring may have a considerable tensile strength, whereas it is still relatively easily bendable in its longitudinal direction.

Because of the nature of use in continuously variable transmissions, where it rotationally connects two pulleys each having two pulley discs that define a V-groove of variable width, the known drive belt is subjected to tensioning, bending and stretching during operation, resulting in high internal stress levels that vary in dependence on the rotational speed of the pulleys and the torque applied to the transmission. The trajectory of the belt thereby includes two longitudinally straight parts where it crosses over from one pulley to the other and two longitudinally bent parts where it runs between the discs of a pulley at a respective radius of curvature for each of the two pulleys, which radii define the transmission ratio of the transmission. As a result of the tensioning, bending and stretching, a tensile stress in the continuous band near its radially inwardly oriented surface and a tensile stress near its radially outwardly oriented surface varies cyclically between a maximum stress level and a minimum stress level during operation of the drive belt in the transmission. Such cyclical variations render the drive belt prone to fatigue cracking, which may ultimately cause the drive belt to break apart and fail. To minimise the risk of belt failure due to fatigue cracking, or put alternatively to extend functional belt life as much as possible by improving its resistance against fatiguing, the known continuous bands are pre-bent, i.e. they are provided with an internal residual stress distribution during manufacturing. According to the known art the internal residual stress distribution is provided such that during operation of the drive belt the maximum tensile stress near the radially inwardly oriented surface and the maximum tensile stress near the radially outwardly oriented surface of the continuous bands are equal and, consequently, that the overall maximum tensile stress is at a minimum. The above-mentioned situation occurs when the internal residual stress distribution of a continuous band corresponds to a stress distribution under the influence of which the continuous band would be longitudinally bent at a radius of curvature that is twice a minimum radius of curvature at which it may be bent during operation. The radius of curvature at which a continuous band would be curved under the influence of the internal residual stress distribution, e.g. when cut, is hereby denoted as a pre-bending radius. This relation between pre-bending radius and minimum radius of curvature accurately holds, particularly when a thickness of the continuous band as seen in the radial direction of the curvature is relatively small compared to the minimum radius of curvature, which is normally the case for the drive belt. It is remarked that it is known from EP0.283.303 B1 to determine such internal residual stress distribution of a continuous band by transversely cutting the continuous band and by measuring the radius of the curvature in the longitudinal direction of the posture assumed by the cut continuous band.

Thus according to the known art the desired pre-bending radius is defined as twice the minimum radius of curvature at which the endless ring is bent in its longitudinal direction during normal operation of the transmission in which the drive belt is applied. It is noted that generally speaking and at least for drive belts to be applied in passenger car transmissions, such minimum radius of curvature occurring during operation corresponds fairly accurately to a minimum physical radius of curvature of the drive belt that is determined by the transverse elements having a taper defining a maximum amount of mutual rotation of adjacent and mutually contacting elements about an axial of the drive belt in combination with a dimension of the elements in the longitudinal direction of the drive belt, alternatively denoted element thickness. Of course, the latter minimum radius is somewhat, though usually only slightly, smaller than the minimum radius of curvature actually occurring during operation to allow the full range of transmission ratios of the transmission to be realised. In practice, the optimum pre-bending radius of the continuous bands may be accurately approximated by increasing the minimum physical radius of curvature of the drive belt by about 10%, at least for typical automotive application of the drive belt such as in passenger cars.

Although pre-bent at such pre-bending radius the continuous bands should provide the drive belt with a longest possible functional life, it surprisingly appeared in practice that the drive belt is still prone to early failure with respect to what was to be expected theoretically. Accordingly, currently applied drive belts are over dimensioned with respect to their nominal torque transmission capacity, which means that they are provided with an endless ring or rings that has or have a larger longitudinally facing cross sectional surface area than that what would theoretically required according to the known art. Such increased cross sectional surface area favourably decreases the maximum stress level in the continuous bands, which may for instance be realised by increasing the number of continuous bands applied in a ring or by increasing the transverse width thereof. These measures, however, adversely affect the drive belt cost price and size and, therefore, are principally undesirable.

SUMMARY OF THE INVENTION

It is an object of the invention to improve the functional life of the known drive belt without increasing its cost price, or, alternatively, lowering the cost price of the drive belt for a given nominal torque transmission capacity. According to the invention this objects is surprisingly realised with the drive belt according to the below.

Extensive—fatigue—testing, both with assembled drive belts and with separate continuous bands running around two cylindrical rollers, and analysis of the results thereof surprisingly appeared to reveal that, at least in those cases where drive belt failure could be indisputably attributed to fatiguing of a continuous band, the drive belt functional life could be improved by adopting a pre-bending radius that is considerably larger than twice the minimum radius of curvature that occurs during operation, which was previously considered the optimal value. According to the invention, this phenomenon may be accounted for by the observation that in the known drive belts fractures appear to initiate more often near the radially inwardly oriented surface of the radially innermost continuous band of the ring than near the radially outwardly oriented surface. From these observations, it is hypothesised that as a result of he interaction between the transverse elements in the curved trajectory part of the drive belt and the radially inwardly oriented surface of the radially innermost continuous band the stress level near the radially inwardly oriented surface are elevated, e.g. as a result of locally introduced contact stresses. It is further hypothesised that the discrepancy between the known theory and the tested practice may be the result of the transverse elements causing contact stresses in the continuous band, which result from the elements being pushed radially outwards by the pulley against the endless ring that is thereby tensioned and which accordingly are predominantly localised near the radially inwardly oriented surface of the radially innermost continuous band. These contact stresses are superimposed on the tensile stress in the continuous band during operation of the drive belt due to the tensioning, bending and stretching and disadvantageously appear to locally increase the tensile stress levels. Particular in case of continuous bands made from a material containing non-metallic inclusions, such as for instance Titanium-Nitride (TiN) or titanium-Carbide (TiC) inclusions, which are normally contained in the materials such as managing steels that are presently applied for the continuous bands of drive belts, the phenomenon appears to be quite pronounced and critical. With such materials a fatigue fracture of the band that leads to the failure of the belt appeared to initiate not at its surface, which would normally be expected, but inside the band material though relatively close to the surface at the location of a non-metallic inclusion. Apparently, such inclusions, at least when they are of significant size, e.g. having a dimension larger than approximately 5 microns, locally raise the stress level in the continuous band above the nominal levels of the above-mentioned contact and tensile stresses.

By pre-bending at least the radially innermost continuous band of the endless ring in accordance with the present invention, the maximum tensile stress due to the bending and stretching is reduced near its radially inwardly oriented surface at the expense of an increased tensile stress near its radially outwardly oriented surface, which would appear to be undesirable, since by this measure the overall maximum stress level in the continuous band is also increased and a decrease in fatigue strength would consequently be expected. However, according to the invention in this manner the fatigue strength is in fact surprisingly increased, because the disadvantageous effect of the contact stresses near the radially inwardly oriented surface of the continuous bands are at least partly compensated for by the reduced tensile stress due to bending. Thus given the nature of the application of the continuous band in a drive belt for application in a continuously variable transmission, the measure according to the invention appears to more or less levels out the maximum tensile stress levels during operation. With this measure, the resistance against fatiguing of the innermost continuous band may be increased surprisingly without reducing the maximum allowable load on the drive belt during operation, i.e. without reducing its nominal torque transmission capacity.

It is remarked that it is generally considered particularly cost effective if all continuous bands in the ring have the same pre-bending radius, i.e. may be manufactured in the same manufacturing process using similar process settings. According to the invention this may indeed be allowed, because even though the other continuous bands of such drive belt are subjected to an increased maximum stress level near their respective radially outwardly oriented surface, the radially innermost continuous band receives additional stresses during operation of the drive belt, such as the contact stresses, and accordingly will still be the most prone to fatigue cracking. Of course, when a given maximum pre-bending radius is exceeded, the increased maximum stress level near the radially outwardly oriented surface of the continuous band may cause local fatigue crack initiation. A suitable maximum workable ratio between the maximum stress levels near the radially outer and radially inner surface respectively was found to be about 3. Below such value, the crack initiation appears to be more or less randomly distributed between the radially inwardly and outwardly oriented surfaces. Using the known equations that relate the maximum stress levels to the pre-bending radius, which are e.g. known from EP-B1-0.279.645, it may be calculated that the maximum stress ratio conform's to a pre-bending radius having a value of about 4.0. Thus according to the invention the pre-bending radius preferably has a value in the range between 2.5 and 4.0 times the minimum radius of curvature of the endless ring that occurs during operation, preferably having a value about halfway the range, i.e. approximately 3.3 times the minimum radius of a longitudinally curved part of the drive belt. Adopting a still larger pre-bending radius was found to undesirably result in fatigue crack initiation near the radially outwardly oriented surface of the continuous band.

In this respect, it is noted that in the known belt during operation interaction also may occur between the radially outermost continuous band of the endless ring and the transverse elements. Such feature appears to be caused by the phenomenon that due to elastic deformation of the pulley discs at the location where the endless ring of the drive belt exits the V-groove, the transverse elements thereof tend to continue to rotate with the pulley until they are pulled away from the pulley by the endless ring, through interaction with the radially outermost continuous band thereof. This interaction causes contact stress that locally effect a higher load on the radially outermost continuous band, in particular near its radially outwardly oriented surface. Accordingly, the invention also relates to a drive belt provided with an endless ring comprising at least two concentrically stacked continuous bands, the radially outermost band of the endless ring being provided with a pre-bending radius that is slightly less than 2 times, preferably about 1.9 times the minimum radius of a longitudinally curved part of the drive belt.

If it is considered to be more preferable to adopt continuous bands in the ring all provided with the same pre-bending radius, the additional load on the outermost continuous band may still be taken into account by adopting a ratio between the maximum stress levels that is somewhat lower than the preferred value of 3.3 mentioned earlier, thereby decreasing the maximum stress level near the radially outer surface of the continuous bands. According to the invention, a pre-bending radius of about 3 times the minimum radius of a longitudinally curved part of the drive belt was in this respect found suitable.

In an alternative embodiment of the invention, the pre-bending radius of the continuous band varies along its circumference between a minimum pre-bending radius and a maximum pre-bending radius, preferably varying elliptically. Such a continuous band has a significant advantage in a preferable manufacturing process, which includes at least the process steps of pre-bending the continuous bands evenly along its circumference, which results in a more or less evenly distributed internal residual stress distribution, and subsequently heat-treating the continuous band. In the latter process step the continuous band needs to be reliably suspended in a furnace with its surface exposed as much as possible, so as to realise a complete and evenly distributed heat treatment. According to the invention, in fulfilling these requirements together with easy product handling it is highly advantageous to force the band in a more or less elliptical shape, such that its tendency to assume the circular shape that was realised in the pre-bending process step may be used to reliably hold the band in a suspension device. Moreover, the elliptical shape is preferably for reasons of process capacity, in particular in case of a (semi-) continuous or production process. Relaxation of the internal stresses that occurs during the heat-treatment will, as a consequence of this suspension method, not be uniform along the circumference of the continuous band and the pre-bending radius will thus vary along between a minimum pre-bending radius and a maximum pre-bending radius.

Departing from the known art and given a desired ratio between the maximum and the minimum pre-bending radii, it would be considered preferable that the actual maximum and minimum pre-bending radii lie mirrored on either side of the optimum value of twice the minimum radius of longitudinal curvature such that the maximum tensile stress near the radially inwardly oriented surface and the maximum tensile stress near the radially outwardly oriented surface of the continuous bands are again equal. Based on the above-mentioned insights and experiences, however, superior fatiguing properties are in this respect surprisingly obtained with the drive belt according to the below.

A further improvement may be realised if the smallest value of the pre-bending radii, which appears to be the most critical based on the insight that fatigue crack initiation in practice occurs predominantly near the radially inwardly oriented surface of the continuous band, is at least equal to 2 times the minimum radius of a longitudinally curved part of the drive belt. Thus, to advantageously realise optimum process handling of the continuous band at least without deteriorating its fatigue strength, according to the invention the smallest pre-bending radius of the ratio the continuous band is equal to or larger than twice the minimum radius of longitudinal curvature. According to the invention the ratio between the maximum pre-bending radius and the maximum pre-bending radius thereby is between 1.5 to 2.5, or, more preferably, about 2, so as to realise a desirable process handling while keeping the difference in the maximum stress levels along the circumference of the continuous band within an acceptable limit.

In a further elaboration of the invention, both the minimum pre-bending radius and the maximum pre-bending radius have a value in the range between 2.5 and 4 that was defined earlier. In this manner an optimal drive belt fatigue resistance may be realised, however, since the ratio between the pre-bending radii is about 1.6 at most, the process handling will be slightly less than optimal.

BRIEF DESCRIPTION OF THE DRAWINGS

With the above and other objects in view, which will become apparent from the detailed description below, preferred embodiments of flexible belt type transmission means according to the invention are shown in the accompanying drawings, in which.

DESCRIPTION OF THE PREFERRED EMBODIMENTS

Figure 1:
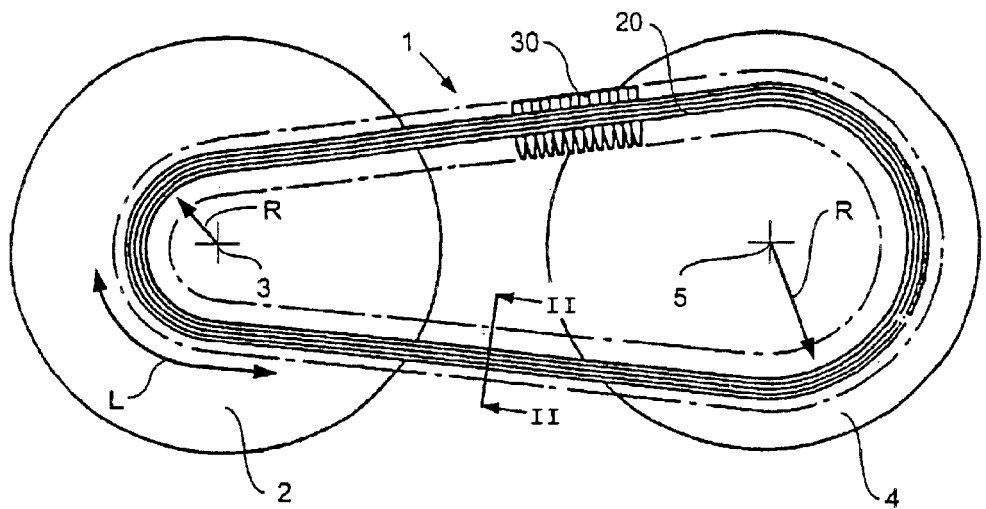
FIG. 1 is a diagrammatic elevation in section of a continuously variable transmission provided with a drive belt of the present type known per se.

FIG. 1 depicts a diagrammatic elevation in section of a continuously variable transmission provided with a drive belt 1 of the present type that is known per se. The transmission comprises a drive pulley 2 rotatable about a drive axle 3, a driven pulley 4 rotatable about a driven axle 5 and a drive belt 1 drivingly connecting the pulleys 2 and 4. Each pulley 2, 4 of the transmission comprises two conical discs defining a V-groove in which a part of the drive belt 1 is positioned in a trajectory that is bent in the longitudinal direction L of the belt 1. In between the pulleys 2 and 4, the drive belt 1 runs in a longitudinally straight trajectory part. The radii of curvature R of the drive belt 1 in the bent parts of its trajectory are controlled in a mutually coordinated manner in order to realise a wanted speed and torque transmission ratio between the pulleys 2 and 4. This control is generally known in the relevant art and will not be discussed here further. The transmission belt 1 comprises an endless ring 20 and a number of plate-like transverse elements 30, which in the bent trajectory parts of the drive belt 1 are clamped between and thus into friction contact with the discs of each of the drive pulley 2 and the driven pulley 4 for transmitting a torque there between.

Figures 2, 3:
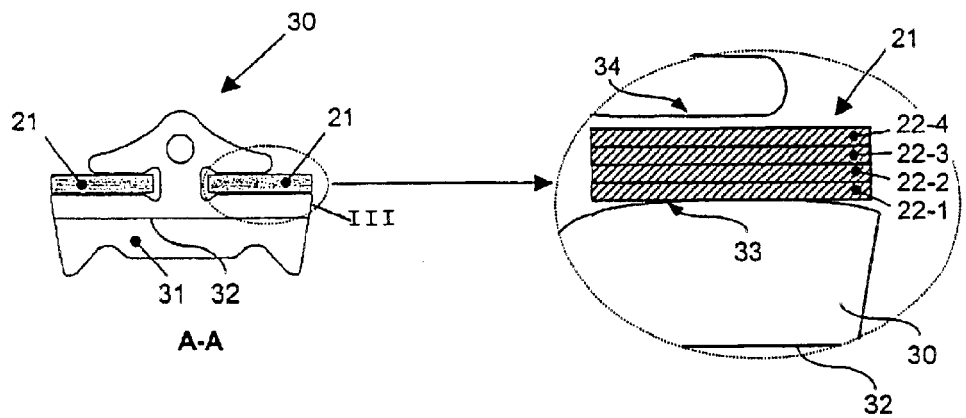
FIG. 2 depicts the known drive belt as seen in section II—II of FIG. 1.
FIG. 3 depicts part III of the drive belt according to FIG. 2 in more detail.
Figure 4:
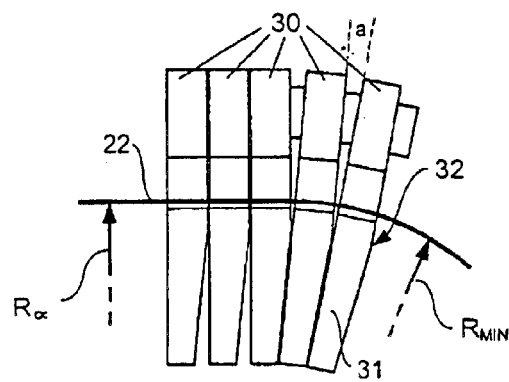
FIG. 4 schematically depicts the known drive belt in side elevation illustrating the minimum radius of curvature at which the drive belt and its continuous bands may be bent in the longitudinal direction.

FIG. 2 depicts the drive belt 1 according to the cross section A—A indicated in FIG. 1. The drive belt 1 shown is provided with two endless rings 21 that have laminated structure comprising of a number of concentrically stacked, i.e. radially nested, continuous bands 22 (22-1, 22-2, 22-3 and 22-4), which is indicated in FIG. 3 that depicts an enlarged section of the drive belt 1. The rings 21 are provided in slots provided in the transverse elements 30, each slot has a radially outwardly oriented boundary surface that is denoted saddle surface 33 and a radially inwardly oriented boundary surface that is denoted upper surface 34, such that the elements 30 may slide along the circumference of the endless ring 21 in the longitudinal direction L thereof. To allow the drive belt 1 to pass along a bent trajectory, the transverse elements are provided with a tapered radially inner part 31, where a thickness of the elements 30, i.e. their dimension in the longitudinal direction L, decreases towards the radially inner side of the drive belt 1. This allows two adjacent and mutually contacting transverse elements to tilt about a transversely oriented tilting edge 32 on the elements, whereby the drive belt 1 bends in its longitudinal direction L. As indicated in FIG. 4, the tapered part 31 determines a maximum tilting angle a between two adjacent transverse elements 30, which together with the nominal thickness of the elements 30, determines a minimum radius of curvature $R_{MIN}$ at which the drive, belt 1, or, more precisely, the endless ring 21 thereof may be bent in its longitudinal direction. Accordingly, the radius of curvature of a longitudinal section of the drive belt 1 may vary between a maximum radius $R\infty$ where the endless ring 21 has assumes a straight posture and a minimum radius $R_{MIN}$ where the endless ring 21 is the most tightly curved in the longitudinal direction L. In typical automotive transmission applications of the drive belt 1, the plate-like transverse elements 30 have a thickness in a range from 1.0 mm to 2.5 mm, whereas the circumference length of the endless ring 21 has a value in a range from 600 mm to 900 mm. The taper 31 of the transverse elements 30 is typically defined such that the minimum radius of longitudinal curvature $R_{MIN}$ is about 25 mm to 35 mm. It is noted that the smallest radius of curvature to which the drive belt 1 is actually subjected in the transmission during operation is typically slightly larger than the minimum radius of longitudinal curvature $R_{MIN}$ to provide some tolerance for manufacturing inaccuracies of the drive belt 1 and the transmission in which it is applied.

Figure 5:
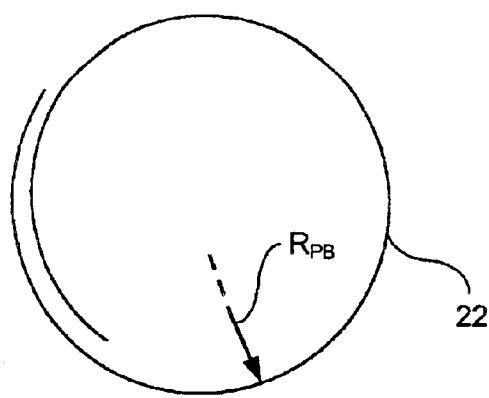
FIG. 5 is graph wherein the maximum tensile stress near a radially outwardly oriented surface of a continuous band of the known drive belt as well as the maximum tensile stress near a radially inwardly oriented surface thereof are plotted in relation to its pre-bending radius.

Because of the nature of use in continuously variable transmissions, where it rotationally connects the pulleys 2 and 4, the drive belt 1 is continuously being bent and straightened during operation. This causes the tensile stress near a radially inwardly oriented surface and near a radially outwardly oriented surface of each of the continuous bands to vary between a maximum stress level and a minimum stress level. To minimise the maximum stress level, it is known to provide each continuous band 22-1, 22-2, 22-3 and 22-4 of the drive belt 1 with an internal residual stress distribution during manufacturing of the continuous band 22 such that, when transversely cut as illustrated by FIG. 5, the continuous band 22 assumes a longitudinally curved shape having a radius of curvature, the so-called pre-bending radius $R_{PB}$, that is twice the minimum radius of curvature $R_{MIN}$. According to the graph depicted in FIG. 6, which provides the relation between the maximum tensile stress near a radially inwardly oriented surface of the continuous band $\sigma_{MAX-IN}$ and the maximum tensile stress near a radially outwardly oriented surface thereof $\sigma_{MAX-OUT}$ and the pre-bending radius $R_{PB}$, shows that at the pre-bending radius of twice the minimum radius of curvature $R_{MIN}$ the maximum tensile stresses $\sigma_{MAX-IN}$ and $\sigma_{MAX-OUT}$ are equal, whereby the dotted line $\Delta\sigma_{MAX}$ indicates the difference between the stresses $\sigma_{MAX-IN}$ and $\sigma_{MAX-OUT}$. Consequently, the maximum tensile stress level occurring overall in the continuous band 22 is at a minimum under these circumstances.

Figure 6:
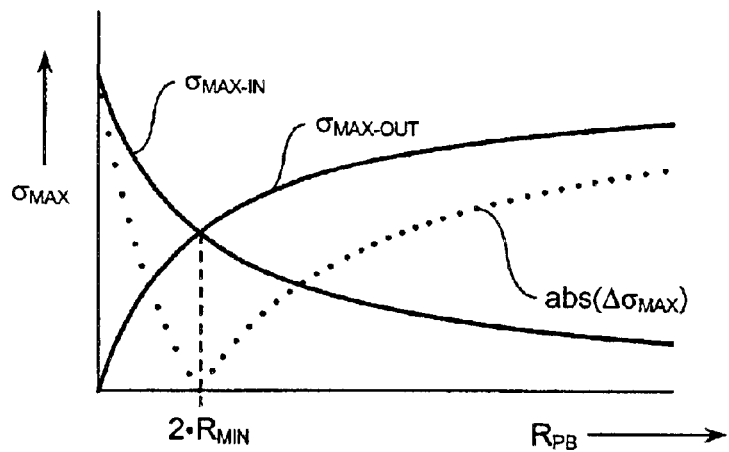
FIG. 6 depicts the shape of a cut continuous band with an essentially constant pre-bending radius.
Figure 7:
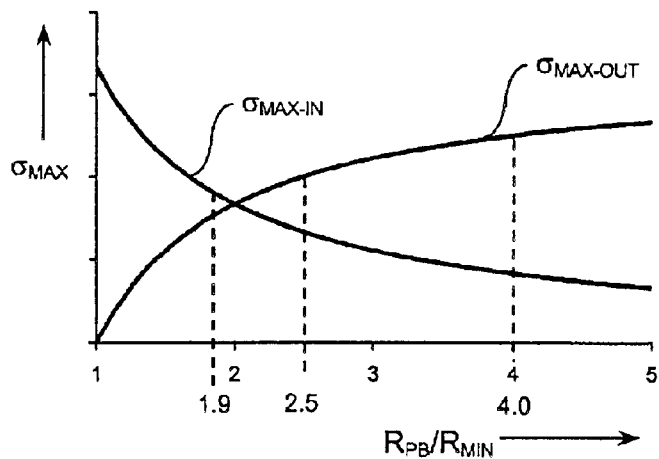
FIG. 7 is graph wherein the maximum tensile stress near a radially outwardly oriented surface of a continuous band of the known drive belt as well as the maximum tensile stress near a radially inwardly oriented surface thereof are plotted in relation to the ratio of its pre-bending radius and its minimum radius curvature in the longitudinal direction.

Now, according to the invention, it has been observed in practice that during operation of the drive belt 1, at least in those cases where its failure could be unambiguously attributed to fatiguing of a continuous band 22 thereof, its service life could be significantly improved by providing a continuous band a pre-bending radius $R_{PB}$ that is substantially larger than twice the minimum radius of curvature that occurs during operation $R_{MIN}$ previously considered optimal. More in particular, according to the invention, the pre-bending radius $R_{PB}$ of at least the radially innermost continuous band 22-1 of the ring 21 should be at least 2.5 times the minimum radius of curvature that occurs during operation $R_{MIN}$. This and other embodiments of the invention are indicated in the graph of FIG. 6, which largely conforms to FIG. 5, however, with the quotient of $R_{PB}$ and $R_{MIN}$ plotted on the horizontal axis. By the measure according to the invention the particular application of the continuous band 22 in the drive belt 1, where its radially inwardly oriented surface is forced slideably into contact with a large number of transverse elements 30 having a width which is small compared to the minimum radius of curvature $R_{MIN}$ is taken into account. It is hypothesised that in the curved trajectory part of the drive belt 1, the interaction between the transverse elements 30, more in particular the saddle surfaces 33 thereof, and the radially inwardly oriented surface of the radially innermost continuous band 22-1 locally additionally elevates the tensile stress to a level causing premature failure of that band 22-1, particularly when compared to the other bands 22-2, 22-3 and 22-4 in the ring 21.

According to invention the other, more radially outwardly located, continuous bands 22-2, 22-3 and 22-4 are preferably provided with a pre-bending radius $R_{PB}$ generally conforming to that of the innermost continuous band 22-1. Although from FIG. 6 it appears that with this pre-bending radius according to the invention the overall maximum tensile stress is increased in the respective bands 22-2, 22-3 and 22-4 and in particular the maximum tensile stress near the radially outwardly oriented surface $\sigma_{MAX-OUT}$ thereof, the additional stress received by the innermost continuous band 22-1 during operation of the drive belt is found to be larger still, so that this innermost band 22-1 will remain the most prone to fatigue cracking. Of course, when a given threshold pre-bending radius $R_{PB}$ is exceeded, the increased maximum stress level near the radially outwardly oriented surface of the continuous band 22 may cause local fatigue crack initiation. A suitable maximum workable ratio between the maximum stress levels due to the bending and stretching of the continuous band 22 was found to be 3, which conforms to a minimum pre-bending radius of about 4 times the minimum radius of a longitudinally curved part of the drive belt 1 when calculated using the equations known from EP-B1-0.279.645 for the maximum stress levels. Adopting a still larger pre-bending radius $R_{PB}$ undesirably appeared to result in fatigue crack initiation near the radially outwardly oriented surface of the continuous band 22.

In a further elaboration of the invention at least for a drive belt 1 that is typically used in automotive applications and more in particular in passenger vehicle applications, a significant improvement in belt life was obtained by providing at least the radially innermost continuous bands 22-1 of the endless ring 21 with a pre-bending radius $R_{PB}$ of about 3.3 times the minimum radius of curvature $R_{MIN}$ of a longitudinally curved part of the endless ring 21.

It is noted that during operation of the drive belt 1 interaction also may occur between the radially outermost continuous band 22-4 of a ring 21 of the endless ring 20 and the transverse elements 30, in particular the upper surface 34 thereof. Such feature appears to be caused by the phenomenon that due to elastic deformation of the pulley discs at least at the location where the endless ring 21 of the drive belt 1 exits the V-groove, the transverse elements 30 thereof tend to continue to rotate with the pulley discs until they are pulled away from the pulley 4 or 5 by the endless ring 21 through interaction between the radially outermost continuous band 22-4 thereof and the upper surface 34. This interaction results in contact stresses that elevate the tensile stresses occurring near the radially outwardly oriented surface of the radially outermost continuous band 22-4. The invention is thus also concerned with a drive belt 1 comprising at least one endless ring 21 provided with number of concentrically stacked continuous bands 22, the radially outermost band 22-4 of which being provided with a pre-bending radius $R_{PB}$ that is slightly less than 2 times, preferably about 1.9 times, the minimum radius of curvature $R_{MIN}$.

In an alternative embodiment of the invention, the pre-bending radius $R_{PB}$ of the continuous band 22 varies along its circumference between a minimum pre-bending radius $R_{PB-MIN}$ and a maximum pre-bending radius R preferably varying elliptically according to the equation:

$$R_{PB}(\phi)=\sqrt{(R_{PB-MAX}\cdot\cos(\phi))^2+(R_{PB-MIN}\cdot\sin(\phi))^2}$$

wherein $\phi$ is an angle of rotation that runs from 0 to 360 degrees.

Figure 8:
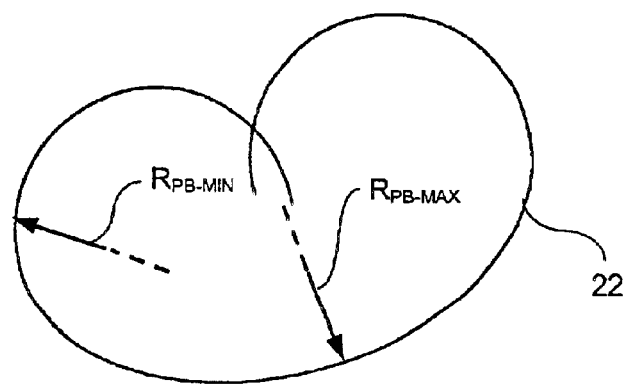
FIG. 8 depicts the shape of a cut continuous band with a pre-bending radius that varies elliptically between a minimum and a maximum pre-bending radius.

When cut, such elliptically pre-bent continuous band 22 assumes a longitudinally bent posture having a varying radius of curvature $R_{PB}$ such as is illustrated in FIG. 8. Such a continuous band 22 has a significant advantage in a production process that according to the invention may be preferred for the manufacturing of the continuous band 22 according to the invention, which process includes at least the process steps of pre-bending and of subsequent of heat-treatment of the continuous band 22.

Figure 9:
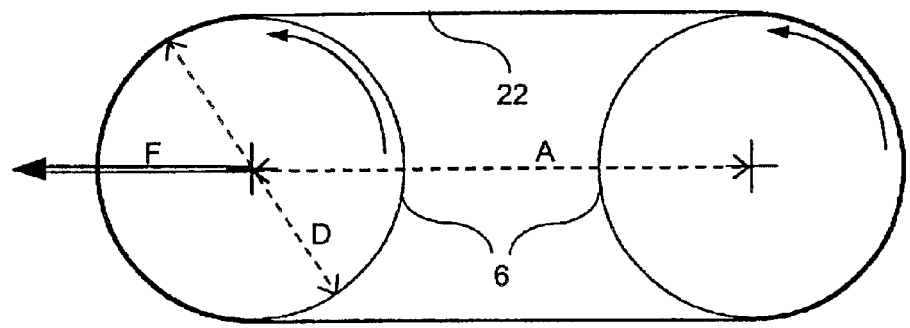
FIG. 9 schematically illustrates a process used for pre-bending the continuous band during the manufacturing thereof.

The process step of pre-bending is illustrated in FIG. 9. In this process the continuous band 22 is wrapped around two cylindrical rollers 6 having a roller diameter D that is somewhat smaller than a desired minimum pre-bending radius $R_{PB-MIN}$ which rollers 6 are subsequently drivingly rotated together with the continuous band 22. At the same time a force F is exerted on at least one of the rollers 6 pulling it away form the respective other roller 6, thereby increasing a centre distance A there between. By this process the continuous band 22 is pre-bent and at the same time elongated slightly, whereby the accompanying band deformation is distributed evenly along the circumference of the band 22. This process typically results in a more or less evenly distributed internal residual stress distribution and consequently in the pre-bending radius $R_{PB}$, at least approximately, being constant along the circumference of the band 22. For the purpose of the present invention it was found that, at least for presently preferred drive belt and continuously variable transmission design, a roller diameter D having a value in the range between 50 mm and 70 mm could be used to yield the pre-bending radius $R_{PB}$ according to the invention.

Figure 10:
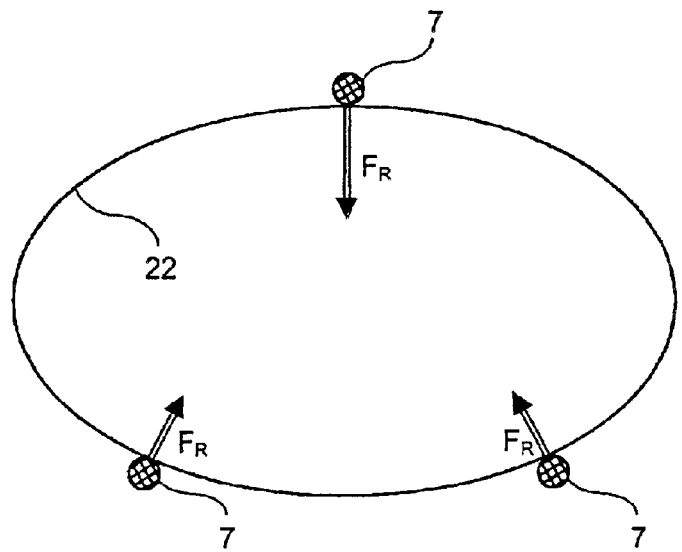
FIG. 10 schematically illustrates a preferable manner of handling the continuous band during the manufacturing thereof.

The process step of heat-treatment requires the continuous band 22 to be reliably suspended in a furnace with its surface exposed to the environment as much as possible, so as to realise a complete and evenly distributed heat treatment of the band 22. According to the invention, in fulfilling this requirement together with: easy product handling it is highly advantageous to force the band 22 in a more or less elliptical shape as seen in side elevation. As is indicated in FIG. 10 this may for instance be realised by means of three or more strategically placed rods 7. By this measure a tendency of the band 22 to reassume its circular shape that was realised in the pre-bending process step effects reaction forces $F_R$ between the rods 7 and the band 22 as indicated in FIG. 10. The forces $F_R$ may be used to hold the continuous band 22 reliably in a suspension device. The elliptical shape thus forced onto the continuous band 22 is also to be preferred for optimising process capacity, in particular in case of a (semi-)continuous or production process, where in particular one dimension of the product determines the process capacity. Relaxation of the internal stress that naturally occurs during the heat-treatment will, as a consequence of such suspension method, not be uniform along the circumference of the continuous band 22 and, accordingly, the pre-bending radius $R_{PB}$ will thus vary along the circumference of the band 22 between the minimum pre-bending radius $R_{PB-MIN}$ and the maximum pre-bending radius $R_{PB-MAX}$. According to the invention this is allowable, particularly when the ratio between the maximum pre-bending radius $R_{PB-MAX}$ and the minimum pre-bending radius $R_{PB-MIN}$ has a value in the range between 1.5 and 2.5, preferably conforms to about 2.

In accordance with the above the invention is also related to a method for manufacturing a continuous band 22 for the above-mentioned drive belt 1 comprising the steps of deforming the band 22 by slightly elongating the band 22 while mounted and rotated around two cylindrical rollers 6 and of heat-treating the band 22 while suspended in a furnace, whereby the rollers 6 have a diameter D having a value in a range from 50 mm to 70 mm. Moreover, it is considered highly advantageous when in the heat-treatment process step the continuous band 22 is hold suspended such that its longitudinal circumference assumes an elliptical posture.

The present invention, apart from the above description and all details of the pertaining drawing, further relates to the features provided by the following claims.

What is claimed is:

1. Drive belt (1) for a transmission realising a continuously variable transmission ratio comprising at least one continuous band (22) engaged with an array of plate transverse elements (30) such that the elements (30) may slide freely along a longitudinal direction (L) of the continuous band (22), whereby the elements (30) are provided with a tapered part (31) allowing mutual rotation of two mutually contacting transverse elements (30) about a transversely oriented tilting edge (32) of the elements (30), thereby defining a minimum radius curvature ($R_{MIN}$) at which the drive belt (1) and the at least one continuous band (22) may be bent in the longitudinal direction (L), whereby the continuous band (22) is provided with an internal residual stress distribution conforming to a posture that is longitudinally bent at a pre-bending radius ($R_{PB}$), characterised in that, the pre-bending radius ($R_{PB}$) of the at least one continuous band (22) is equal to or larger than 2.5 times the minimum radius of curvature ($R_{MIN}$).

2. Drive belt (1) according to claim 1, characterised in that, the pre-bending radius ($R_{PB}$) has a value in a range between 2.5 and 4.0 times the minimum radius of curvature ($R_{MIN}$).

3. Drive belt (1) according to claim 1, characterised in that, the pre-bending radius ($R_{PB}$) conforms to about 3.3 times the minimum radius of curvature ($R_{MIN}$).

4. Drive belt (1) according to claim 1, characterised in that, the pre-bending radius ($R_{PB}$) conforms to about 3 times the minimum radius of curvature ($R_{MIN}$).

5. Drive belt (1) according to claim 1, characterised in that the continuous band (22) is made from a material incorporating non-metallic inclusions.

6. Drive belt (1), according to claim 1, for a transmission realising a continuously variable transmission ratio comprising at least one continuous band (22) engaged with an array of plate transverse elements (30) such that the elements (30) may slide freely along a longitudinal direction (L) of the continuous band (22), whereby the elements (30) are provided with a tapered part (31) allowing mutual rotation of two mutually contacting transverse elements (30) about a transversely oriented tilting edge (32) of: the elements (30), thereby defining a minimum radius curvature ($R_{MIN}$) at which the drive belt (1) and the at least one continuous band (22) may be bent in the longitudinal direction (L), whereby the continuous band (22) is provided with an internal residual stress distribution conforming to a posture that is longitudinally bent at a pre-bending radius ($R_{PB}$), characterised in that the pre-bending radius ($R_{PB}$) varies along the circumference of the continuous band (22) between a maximum pre-bending radius ($R_{PB-MAX}$) and a minimum pre-bending radius ($R_{PB-MIN}$), such that when averaged over the longitudinal circumference of the at least one continuous band (22), the pre-bending radius ($R_{PB}$) has a value in the range between 2.5 and 4 times the minimum radius of curvature ($R_{MIN}$).

7. Drive belt (1) according to claim 6, characterised in that a ratio between the maximum pre-bending radius ($R_{PB-MAX}$) and the minimum pre-bending radius ($R_{PB-MIN}$) has a value about equal to 2.

8. Drive belt (1) according to claim 6, characterised in that the minimum pre-bending radius ($R_{PB-MIN}$) is at least equal to two times the minimum radius of curvature ($R_{MIN}$).

9. Drive belt (1) according to claim 6, characterised in that a ratio between the maximum pre-bending radius ($R_{PB-MAX}$) and the minimum pre-bending radius ($R_{PB-MIN}$) has a value in the range between 1.5 and 2.5.

10. Drive belt (1) according to claim 5, characterised in that, when averaged over the longitudinal circumference of the at least one continuous band (22), the pre-bending radius ($R_{PB}$) has a value in the range between 3.0 and 3.3 times the minimum radius of curvature ($R_{MIN}$).

11. Drive belt (1) according to claim 6, characterised in that both the maximum pre-bending radius ($R_{PB-MAX}$) and the minimum pre-bending radius ($R_{PB-MIN}$) have a value in the range between 2.5 and 4 times the minimum radius of curvature ($R_{MIN}$).

12. Drive belt (1) according to claim 1, characterised in that the drive belt (1) is provided with at least one ring (21) comprising a number of concentrically stacked continuous bands (22-1, 22-2, 22-3, 22-4) and in that the at least one continuous band (22) is a radially innermost band (22-1) of the ring (21).

13. Drive belt according to claim 12, characterised in that, the other continuous bands (22-2, 22-3, 22-4; 22-2, 22-3) of the number of concentrically stacked continuous bands (22-1, 22-2, 22-3, 22-4) are provided with a pre-bending radius ($R_{PB}$) about equal to 2 times the minimum radius of curvature ($R_{MIN}$).

14. Drive belt (1) according to claim 12, characterised in that, a radially outermost band (22-4) of the ring (21) is provided with a pre-bending radius ($R_{PB}$) of about 1.9 times the minimum radius of curvature ($R_{MIN}$).

15. Drive belt (1) according to claim 12, characterised in that, a radially outermost band (22-4) of the ring (21) is provided with a pre-bending radius ($R_{PB}$) slightly less than 2 times the minimum radius of curvature ($R_{MIN}$).

16. Method for manufacturing a continuous band (22) for a drive belt (1) suitable for use in a continuous variable transmission, according to claim 1, comprising the steps of deforming the band (22) by slightly elongating the band (22) while mounted and rotated around two cylindrical rollers (6) and of heat-treating the band (22) while suspended in a furnace, characterised in that the rollers (6) are of a diameter (D) having a value in a range from 50 mm to 70 mm.

17. Method according to claim 16, characterised in that while suspended in the furnace during the heat-treatment process step the continuous band (22) is suspended such that its longitudinal circumference assumes an elliptical posture as seen in a transverse direction.

18. Continuously variable transmission provided with two pulleys (2, 4), each defining a V-shaped groove of variable groove width, and with a drive belt (1) comprising at least one continuous band (22) engaged with an array of plate transverse elements (30) such that the elements (30) may slide freely along a longitudinal direction (L) of the continuous band (22), whereby the elements (30) are provided with a tapered part (31) allowing mutual rotation of two mutually contacting transverse elements (30) about a transversely oriented tilting edge (32) of the elements (30), whereby the continuous band (22) is provided with an internal residual stress distribution conforming to a posture that is longitudinally bent at a pre-bending radius ($R_{PB}$), characterised in that, the pre-bending radius ($R_{PB}$) has a value in the range between 2.5 and 4 times a minimum radius of curvature at which the endless ring (21) is bent in its longitudinal direction (L) during operation of the transmission.

19. Drive belt (1) for a transmission realising a continuously variable transmission ratio comprising:

an array of plate transverse elements (30);

at least one continuous band (22) engaged with the array of elements (30) such that the elements (30) may slide freely along a longitudinal direction (L) of the continuous band (22), the elements (30) provided with a tapered part (31) allowing mutual rotation of two mutually contacting transverse elements (30) about a transversely oriented tilting edge (32) of the elements (30) and defining a minimum radius curvature ($R_{MIN}$) at which the drive belt (1) and the at least one continuous band: (22) may be bent in the longitudinal direction (L), the continuous band (22) provided with an internal residual stress distribution conforming to a posture that is longitudinally bent at a pre-bending radius ($R_{PB}$), wherein the pre-bending radius ($R_{PB}$) varies along the circumference of the continuous band (22) between a maximum pre-bending radius ($R_{PB-MAX}$) and a minimum pre-bending radius ($R_{PB-MIN}$), such that when averaged over the longitudinal circumference of the at least one continuous band (22), the pre-bending radius ($R_{PB}$) has a value in the range between 2.5 and 4 times the minimum radius of curvature ($R_{MIN}$).

20. Drive belt (1) according to claim 19, wherein the continuous band (22) is made from a material incorporating non-metallic inclusions.

* * * * *